UNITED STATES PATENT OFFICE.

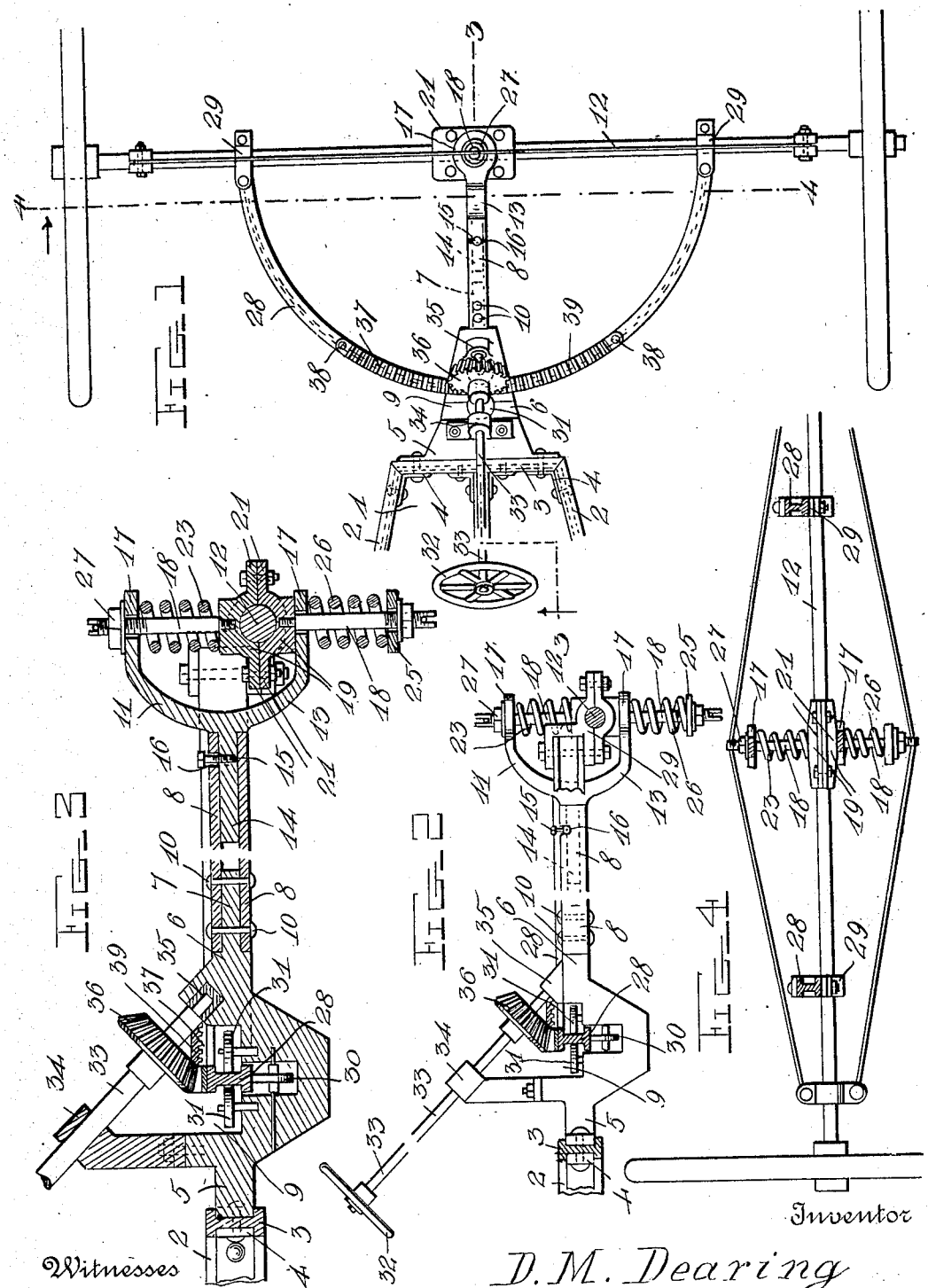

DAVID M. DEARING, OF JACKSON, MICHIGAN, ASSIGNOR OF ONE-HALF TO LOUIS F. BOOS, OF JACKSON, MICHIGAN.

STEERING-GEAR.

No. 871,678.　　　　Specification of Letters Patent.　　　　Patented Nov. 19, 1907.

Application filed February 19, 1906, Serial No. 301,892. Renewed April 1, 1907. Serial No. 365,858.

*To all whom it may concern:*

Be it known that I, DAVID M. DEARING, a citizen of the United States, residing at Jackson, in the county of Jackson and State of Michigan, have invented certain new and useful Improvements in Steering-Gears; and I do declare the following to be a full, clear, and exact description of the invention, such as will enable others skilled in the art to which it appertains to make and use the same.

My invention relates to improvements in steering gears for automobiles and other vehicles.

The object of the invention is to provide a steering gear of this character, of simple, light, strong and durable construction, which will be effective in operation.

With the above and other objects in view, my invention consists of certain novel features of construction, combination and arrangement of parts, as hereinafter described and claimed.

In the accompanying drawings,—Figure 1 is a plan view of the forward portion of a motor vehicle, with my improved steering gear mounted thereon; Fig. 2 is a side elevation of the same; Fig. 3 is a vertical longitudinal sectional view, taken on the plane indicated by the line 3—3 in Fig. 1; and Fig. 4 is a detail vertical transverse sectional view, taken on the plane indicated by the line 4—4 in Fig. 1.

Referring to the drawings by numeral, 1 denotes the forward portion of a running gear frame of any form and construction, but which, as shown, consists of converging longitudinal side beams 2 of I-shape in cross-section, connected at their forward ends with the ends of a similar-shaped cross beam 3, by means of angle plates 4. The plates or straps 4 are riveted, bolted or otherwise secured to the inner faces of the webs of the said beams between their upper and lower flanges, as shown. To the outer or front face of the web of the front cross beam 3 is bolted or otherwise secured the enlarged rear end 5 of a union 6, to the forward end 7 of which is connected a reach bar or tube 8. The union 6 is preferably in the form of a casting, which has in its upper face a recess or cavity 9, and upon its forwardly-tapered end the reduced portion or stem 7, which projects into the bore of or the socket in the reach bar or tube 8, and is secured therein by bolts or the like, 10. In the forward end of the reach bar 8 is rotatably mounted a cushioning or pivoting device 11 for the front steering axle 12. This device 11 comprises a yoke or bracket 13, formed with a rearwardly-projecting end or stem 14, which rotates in the bore or opening in the forward end of the bar 8, and which is retained therein by a pin or the like, 15. Said pin is screwed or otherwise secured in the end 14 of the yoke and projects into a transverse slot 16, formed in the forward end of the reach bar 8. This construction retains the device upon the reach bar, and permits it to rotate slightly therein to allow the axle 12 to swing or tilt in a transverse vertical plane. The forward end of the yoke 13 is forked or bifurcated to form upper and lower arms 17, which are formed with alining apertures to receive pivot and guide pins 18, the latter projecting in opposite directions from upper and lower clamping plates 19, which have recesses in their opposite faces to receive the axle 12, and which are formed with attaching flanges 21, adapted to be bolted or riveted together to clamp the guide upon the axle, so that its pins 18 extend vertically.

Confined between the under face of the upper arm 17 of the yoke, and the attaching plate of the upper guide pin 18 is a coil spring 23, which surrounds said pin, as shown, and between the under face of the lower arm 17 and a stop 25 upon the lower end of the lower pin 18, is a similar coil spring 26. The stop 25 is preferably in the form of a washer and a nut, and a similar stop 27 may be provided upon the upper end of the upper pin 18, as shown. These springs 23, 26, cushion or yieldably support the running gear from the axle, while the guide pins 18 serve as a kingbolt to permit the axle to swing in a horizontal plane for the purpose of steering the vehicle. The steering of the vehicle is effected by providing a semi-circular steering bar 28, which also serves as a hound for the front axle. This bar 28 is preferably in the form of an I-shaped beam bent into a semi-circle, which is concentric with the pivot and guide pins 18, and which has its ends secured by clips 29 to the axle 12, as shown. The connections between the end of said bar and said clip admit of slight vertical play of the bar. The central portion of the semi-circular bar 28 projects and slides through the recess 9 in the union or casting 6, and is guided by a vertically-disposed roller 30 and a pair of horizontally-disposed rollers 31. These rollers are suitably journaled in the recess 9, the vertical one engaging the bottom of the bar 28, and the two horizontal ones engaging the opposite faces of the vertical web of the bar, as clearly shown in Fig. 3. The steering bar 28 is operated by rotating a hand-wheel 32 upon the upper end of a forwardly and downwardly-inclined shaft 33, which has its lower end journaled in bearings 34 and 35, provided upon the front and rear end of the union or casting 6, as shown. Upon said end of the shaft 33 is secured a beveled pinion 36, which meshes with a segmental rack plate 37 upon the top of the semi-circular bar 28. This plate 37 is secured by pins, bolts, rivets or the like, 38, upon said bar, and has cut in its upper face beveled rack teeth 39. The rollers 30, 31 and the beveled pinion admit of the slight angular vertical motion of the curved bar 28, required to enable said bar to convenience itself to the vertical movement of the front end of the frame with respect to the front axle, under the play of the springs 23, 26.

The construction, operation and advantages of my improved steering gear will be readily seen. By mounting the front axle 12 in the cushioning and pivoting device 11, so that the latter turns axially to a slight extent, and the former swings horizontally, and by providing the semi-circular steering bar 28, which serves also as a hound, a very simple and light construction is provided, which will be strong, durable and inexpensive. The provision of the guide rollers in the union or casting guide and support the bar 28, and at the same time permit it to tilt slightly when the device 11 turns on its axis.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is,—

1. A steering gear for vehicles comprising a frame having a reach bar thereon, a front steering axle, a pivoting and cushioning device for said axle upon the front of said reach bar, a guide, and a semi-circular bar engaged with said guide and having its ends connected to said axle at equi-distant points from its pivot.

2. A steering gear for vehicles comprising a reach frame or bar, a front axle, a cushioning and pivoting device for said axle rotatable in the forward end of said reach bar or frame, a roller upon the latter, and a semi-circular steering bar engaged with said roller and having its ends attached to said axle, substantially as described.

3. A steering gear for vehicles comprising a frame, a union attached to the forward end of the same, a reach bar attached to the forward end of said union, a front axle, a cushioning and pivoting device for said axle, rotatably mounted in the forward end of said reach bar, guide rollers mounted in a recess in said union, a semi-circular bar engaged with said guide rollers and having its ends attached to said axle, and a rack plate secured upon the upper face of said bar, substantially as shown and described.

4. A steering gear for vehicles comprising a frame, a reach bar, a union connected to the latter and said frame, a front axle pivotally mounted upon the forward end of said reach bar, a guide in said union, a semi-circular bar engaged with said guide and having its ends attached to said axle, rack teeth upon the upper face of said bar, a shaft journaled in bearings upon said union, and a toothed gear upon said shaft and engaged with said rack teeth, substantially as described.

In testimony whereof I have hereunto set my hand in presence of two subscribing witnesses.

DAVID M. DEARING.

Witnesses:
CHRISTIE A. STEARNS,
FRANK EGGLESTON.